United States Patent
Nie et al.

(10) Patent No.: US 8,650,327 B2
(45) Date of Patent: Feb. 11, 2014

(54) PROCESSOR WITH PROGRAMMABLE VIRTUAL PORTS

(75) Inventors: Shixiang Nie, Suzhou (CN); Zhijun Chen, Suzhou (CN); Zhihong Cheng, Suzhou (CN)

(73) Assignee: Freescale Semiconductor, Inc., Austin, TX (US)

( * ) Notice: Subject to any disclaimer, the term of this patent is extended or adjusted under 35 U.S.C. 154(b) by 35 days.

(21) Appl. No.: 13/604,639

(22) Filed: Sep. 6, 2012

(65) Prior Publication Data
US 2013/0111099 A1 May 2, 2013

(30) Foreign Application Priority Data
Nov. 2, 2011 (CN) .......................... 2011 1 0400936

(51) Int. Cl.
*G06F 3/00* (2006.01)

(52) U.S. Cl.
USPC .............................................. 710/3; 370/392

(58) Field of Classification Search
USPC .................... 710/307, 3, 9; 370/392
See application file for complete search history.

(56) References Cited

U.S. PATENT DOCUMENTS

| | | | |
|---|---|---|---|
| 6,360,281 B1 | 3/2002 | Feagans | |
| 7,200,704 B2 | 4/2007 | Njoku | |
| 7,586,915 B1 | 9/2009 | Indiresan | |
| 7,855,957 B2 | 12/2010 | Madhi, II | |
| 7,996,560 B2 | 8/2011 | Murakami | |
| 2010/0281437 A1 | 11/2010 | Stone-Perez | |

*Primary Examiner* — Clifford Knoll
(74) *Attorney, Agent, or Firm* — Charles Bergere

(57) ABSTRACT

A processor with programmable virtual ports includes a plurality of in/out (IO) pins for transmitting and receiving data. The IO pins are grouped into a plurality of predefined ports, each of which has a physical address stored in one of a memory location of a memory map. The IO pins may be remapped to one or more virtual ports.

16 Claims, 6 Drawing Sheets

| | | |
|---|---|---|
| 31 | Register Space | 0x00_0000 |
| 32 | RAM | 0x00_1000 |
| 33 | EEPROM | 0x10_0000 |
| 34 | Reserved | 0x20_0000 |
| 35 | Reserved | 0x30_0000 |
| 36 | Reserved | 0x40_0000 |
| 37 | Program | 0x50_0000 |
| 38 | Program | 0x60_0000 |

PROCESSOR WITH PROGRAMMABLE VIRTUAL PORTS

BACKGROUND OF THE INVENTION

The present invention relates generally to processors and more particularly to a processor with programmable virtual ports.

In current MCU (micro-control unit) GPIO (General Purpose Input/Output) and IOMUX (input/output multiplexer) design, a plurality of IO pins are usually defined into several ports with a width such as 8 bits, 16 bits or 32 bits, which can be used for function pins (e.g., sci, spi, etc.) or general IO pins, or for function verification and test purposes. Due to different system requirement, pin mux and package configuration, these addressable ports/pins are discrete in almost all MCU chips.

Discrete ports/pins have many disadvantages. For instance, it requires extra effort to configure the port program. Further, performance is degraded for data transfer when ports/pins are discrete. If the port addresses are discrete, the data programs have to be in bit mode, which decreases the application performance, and increases verification and production test time when using the ports for pattern correctness checking. In addition, if the port bus width is changed from chip to chip, the test software may not be re-usable.

Thus, it would be desirable to have a programmable non-discrete 8 bit (or 16 bit or 32 bit) width virtual port, ideally having the same width as that of a chip bus, which eliminates the above-mentioned disadvantages of discrete ports or non-available ports in low-pin-count packages.

BRIEF DESCRIPTION OF THE DRAWINGS

The following detailed description of a preferred embodiment of the invention will be better understood when read in conjunction with the appended drawings. The present invention is illustrated by way of example and is not limited by the accompanying figures.

FIG. 3 is a block diagram of a memory map in accordance with an embodiment of the present invention;

DETAILED DESCRIPTION OF THE INVENTION

Figure 1:
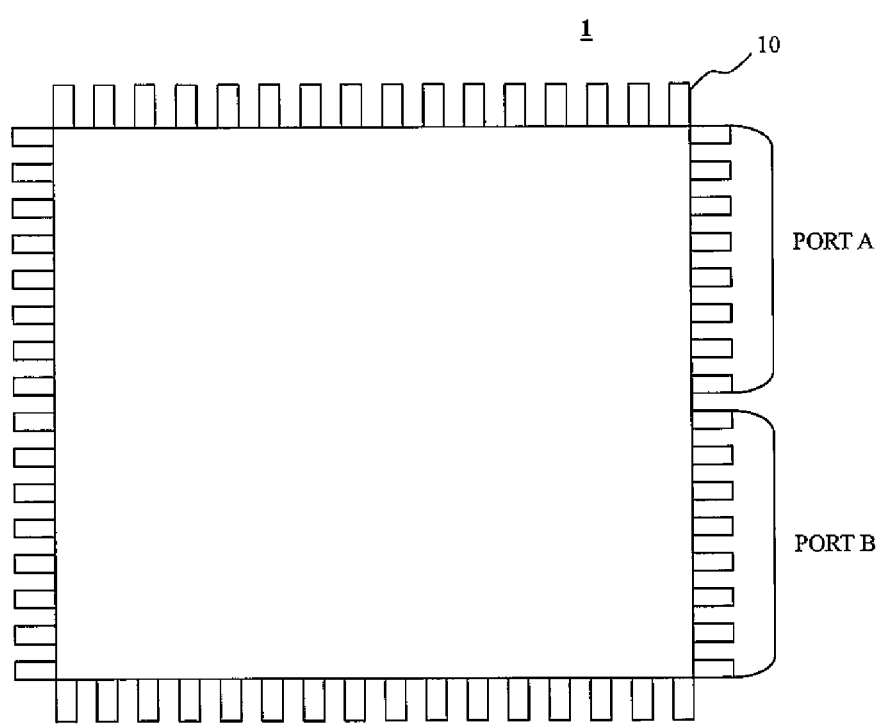
FIG. 1 is a top plan view of a processor with a plurality of in/out (IO) pins.

The detailed description set forth below in connection with the appended drawings is intended as a description of a presently preferred embodiment of the invention, and is not intended to represent the only form in which the present invention may be practiced. It is to be understood that the same or equivalent functions may be accomplished by different embodiments that are intended to be encompassed within the spirit and scope of the invention.

The present invention is directed to a processor having a plurality of in/out (IO) pins for transmitting and receiving data. The IO pins are grouped into a plurality of predefined ports. The processor also includes a memory map having plural memory locations, and each of the predefined ports has a physical address stored in one of the memory locations. The processor further includes at least one virtual port that has a virtual address stored in one of the memory locations. The at least one virtual port includes selected IO pins from two or more of the predefined ports such that the at least one virtual port allows access to the selected IO pins from the two or more predefined ports simultaneously.

The present invention is also directed to a method for programming a processor having a plurality of in/out (IO) pins for transmitting and receiving data, wherein the pins are grouped into a plurality of predefined ports, and a memory map having plural memory locations, wherein each of the predefined ports has a physical address stored in one of the memory locations. The method comprises remapping the IO pins to one or more virtual ports, wherein the one or more virtual ports comprise selected IO pins from two or more predefined ports, and the IO pins in the virtual ports correspond to IO pins in the predefined ports. Further, each of the virtual ports has a virtual address stored in one of the memory locations such that the one or more virtual ports can access the selected IO pins of two or more predefined ports simultaneously.

The present invention is further directed to an electronic device including a Graphic User Interface (GUI) and a processor communicatively coupled with the GUI. The GUI can be any suitable device enabling a user to provide instructions to the processor and being able to display any information from the processor, for example a display screen, keyboard and mouse, a capacitive touch screen, or the like. The processor comprises a plurality of in/out (IO) pins for transmitting and receiving data, wherein the pins are grouped into a plurality of predefined ports; a memory map having plural memory locations, wherein each of the predefined ports has a physical address stored in one of the memory locations; and at least one virtual port having a virtual address stored in one of the memory locations, wherein the at least one virtual port comprises selected IO pins from two or more predefined ports. Therefore, the at least one virtual port enables access to the selected IO pins from two or more predefined ports simultaneously.

The processor with programmable virtual ports of the present invention has several advantages. In particular, the processor of the present invention is able to group pins from different predefined ports into one virtual port. The virtual port assignments are readily programmed so that code for applications is of small size, effective, easy to use, and quickly executed.

Referring now to FIG. 1, a top plan view of a processor 1 with a plurality of in/out (IO) pins 10 is shown. The plurality of IO pins 10 are used to transmit and receive data, as is known in the art. The number and placement of the plurality of IO pins 10 may vary with different configurations of the processor 1 and with different packaging options. For example, for a 32-bit processor, the bus widths may be wider than for a 16-bit version of the processor. Similarly, some package types will have more pins available than other package types, e.g., BGA package vs. DIP.

The IO pins 10 are classified into three categories: pins for performing pre-assigned functions only; pins shared with on-chip peripherals such as timer systems, external interrupts or keyboard interrupts, and being reverted to GPIOs when not being controlled by other modules; and pins functioning as GPIOs. Each of the IO pins 10 has an assigned address and an assigned bit location in a memory map (described below with reference to FIGS. 2 and 3. For the efficacy of performance, the IO pins 10 are grouped into predefined ports (e.g., PORT A and PORT B), where each port contains a predefined number of the IO pins 10 and assigned addresses in the memory map. In general, each port has a set of addresses, for instance, one for data read/write, one for control signals, and so on.

Figure 2:
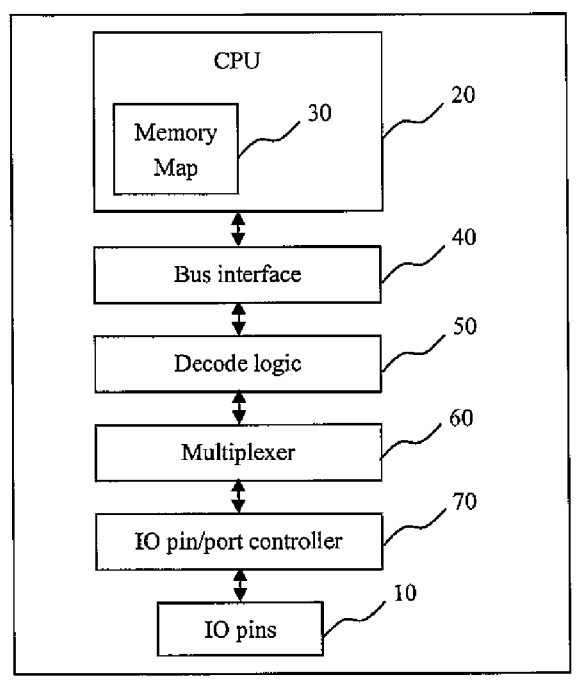
FIG. 2 is a functional block diagram of the processor showing components relevant to the present invention.

Referring now to FIG. 2, a schematic block diagram of the processor 1 showing only those components relevant to the present invention is shown. The processor 1 includes a central processing unit (CPU) 20, a memory map (MM) 30 located within the CPU 20, a bus interface 40, decode logic 50, a multiplexer or mux 60, an IO pin/port controller 70, and the IO pins 10. As previously mentioned, the IO pins 10 are grouped into a plurality of predefined ports, where each port has a unique address that is stored in the MM 30. In operation, the CPU 20 sends a request to the MM 30 via the CPU bus. The MM 30 receives the request and delivers the request to a specified target as shown in FIG. 2. That is, from the MM 30 to the decode logic 50 by way of the bus interface 40. The decode logic 50 reads the data and decodes or re-orders the data and provides the decoded data along with related control signals to the mux 60. The mux 60 determines if the decoded data is to be provided to the IO controller 70 based on the control signals. The IO controller 70 includes one or more registers and logic to control IO status, I/O direction, pull-ups, enable/disable, and output values to be provided to the one or more ports.

FIG. 3 is a diagram of the MM 30. The MM 30 has plural memory locations such as a Register Space 31, RAM 32, EEPROM 33, Reserved spaces 34-36, and program spaces 37-38. As will be understood by those of skill in the art, the configuration of the MM 30 can vary depending on user requirements.

Figure 4:
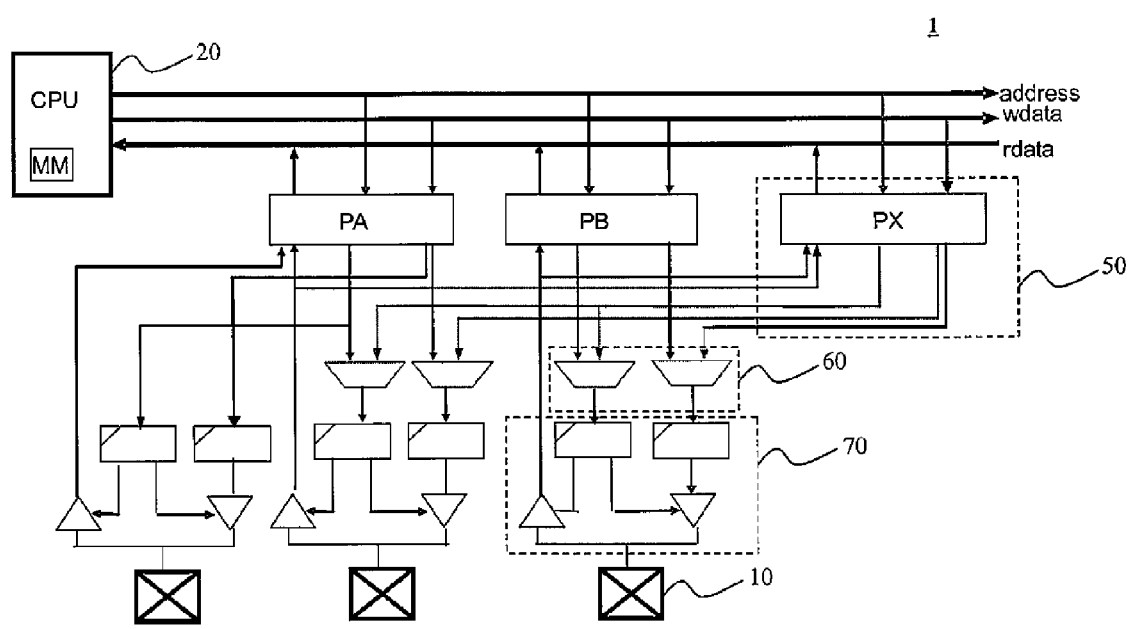
FIG. 4 is a schematic block diagram of the processor with a virtual port in accordance with an embodiment of the present invention.

FIG. 4 is a more detailed schematic diagram of the decode logic 50, mux 60, and IO pin/port controller 70 of the processor 1. In this embodiment, the plurality of IO pins 10 can be mapped to three ports, real ports PA and PB and virtual port PX. Each of the three ports, PA, PB and PX has a unique port address that is stored in the MM 30 of the CPU 20. The virtual port PX contains all or some of the IO pins 10 that belong to ports PA and PB. The IO pins 10 assigned to ports PA and PB are mapped in the MM 30. Similarly, the IO pins 10 assigned to the virtual port PX are mapped in the MM 30, such that each of the IO pins 10 has an assigned address and an assigned bit location in the MM 30.

In operation, when the CPU 20 sends a bus request intended for the virtual port PX, the CPU 20 accesses the MM 30 to determine whether it is a valid access or generate a final address, and then delivers the request to the related interface bus. Then the virtual port PX address request is forwarded to the decode logic 50 via the interface bus (address, wdata, rdata). The decode logic 50 decodes the virtual port PX address request, which is then provided to the mux 60. The mux 60 combines the decoded information and provides the combined information to the IO pin port controller 70. The IO pin port controller 70 controls the status of each pin of the virtual port PX according to the received information from the mux 60 and the IO pin port controller 70 so that each pin in the virtual port PX transmits or receives signals in accordance with the instruction from the CPU 20 and the virtual port definition in the MM 30.

The virtual port PX is programmable. For instance, a virtual port control register located for example in the MM 30 or in the decode logic 50 can be used to dynamically select different ones of the IO pins 10 and assign the selected IO pins to the virtual port PX. If an application needs to use the pins from for example both port A and port B, then the application needs to access both port PA and port PB, resulting in increased execution time and bus loading. If the IO pins 10 being accessed in both ports PA and PB are remapped to the virtual port PX, then the application only needs to access one port, i.e., virtual port PX, so the access is quicker, which saves time, and a single access also reduces bus loading.

Figure 5:
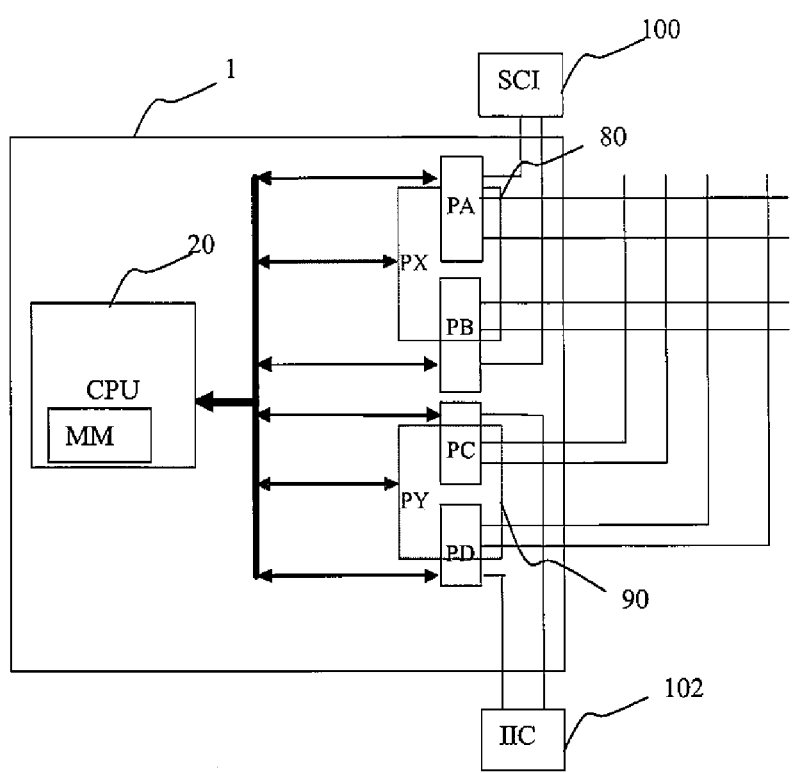
FIG. 5 is a schematic block diagram of the processor with two virtual ports in accordance with an embodiment of the present invention.

Referring now to FIG. 5, a schematic, functional diagram of the processor 1 having two virtual ports in accordance with an embodiment of the present invention is shown. More particularly, the processor 1 has four predefined ports PA, PB, PC and PD, and two virtual ports PX 80 and PY 90. The virtual port PX 80 includes IO pins 10 (not shown in FIG. 5) from physical ports PA and PB, and virtual port PY 90 includes IO pins from physical ports PC and PD. In this case, some of the IO pins of pin ports PA/PB/PC/PD are used for multiple functions (e.g., SCI 100, IIC 102, etc.). Use of the two virtual ports PX 80 and PY 90 instead of the predefined ports PA/PB/PC/PD enables simple, easy coding and saves on pin access time. Writing the virtual port PX 80 instead of pin ports PA, PB can drive both of the ports PA, PB at the same time, thus avoiding any noise or glitch caused by sequential accesses of PA and PB. It is to be noted that one virtual port does not need to include all of the IO pins from one pin port. For example, the virtual port PX 80 can be defined by remapping the high 5 bits of port A and the low 3 bit of port B if the virtual port PX 80 has 8 bits. Further, the number of the IO pins in the virtual ports PX 80 and PY 90 can be different depending upon specific applications. In addition, the virtual ports PX 80 and/or PY 90 can have less or fewer pins than the bus width; thus if the bus width is large enough, all pins especially the GPIO pins can be remapped into one continuous virtual port; thus any combination of pins can be accessed simultaneously.

Figure 6:
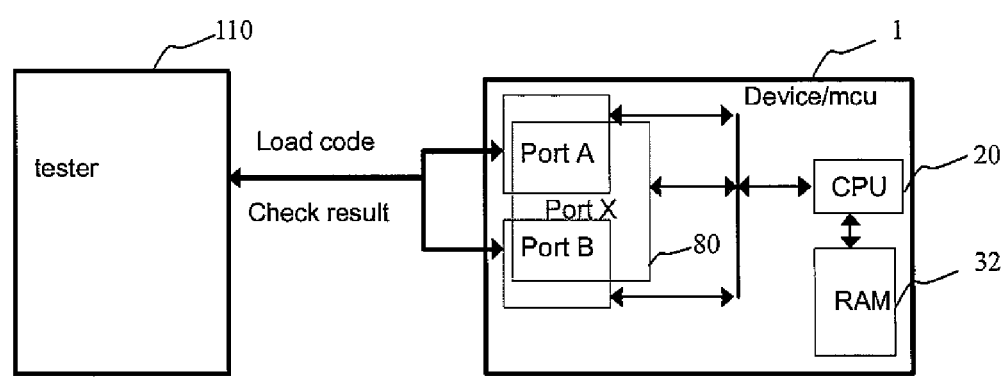
FIG. 6 is a schematic block diagram of the processor with a virtual port connected to a tester in accordance with an embodiment of the present invention.

FIG. 6 is a schematic diagram of the processor 1 with a virtual port X 80 used to interface or allow communication between the CPU 20 and a tester 110, instead of providing for such communication using pre-defined ports A and B. The tester 110 can test IO pins from both Port A and Port B simultaneously by accessing the virtual port X 80. By accessing the virtual port X, the download of boot and test code from the tester 110 to the CPU 20 will be faster than if accessing ports A and B, which would require two or more cycles. Furthermore, the provision of virtual port X allows for fast, parallel testing of ports A and B.

The description of the preferred embodiment of the present invention has been presented for purposes of illustration and description, but is not intended to be exhaustive or to limit the invention to the form disclosed. It will be appreciated by those skilled in the art that changes could be made to the embodiment described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A processor, comprising:
   a plurality of in/out (IO) pins for transmitting and receiving data, wherein the pins are grouped into a plurality of predefined ports;
   a memory map having plural memory locations, wherein each of the predefined ports has a physical address stored in one of the memory locations; and
   at least one virtual port having a virtual address stored in one of the memory locations, wherein the at least one virtual port comprises selected IO pins from two or more predefined ports, and wherein the at least one virtual port allows access to the selected IO pins from two or more predefined ports simultaneously.

2. The processor of claim 1, wherein the at least one virtual port consists of general purpose IO (GPIO) pins.

3. The processor of claim 1, wherein the at least one virtual port has different numbers of IO pins.

4. The processor of claim 1, wherein the at least one virtual port has a number of IO pins that is less than the bus width of the processor.

5. The microcontroller of claim 1, wherein the at least one virtual port has a number of IO pins that is equal to the bus width of the processor.

6. A method for programming a processor, wherein the processor comprises a plurality of in/out (IO) pins for transmitting and receiving data, wherein the pins are grouped into a plurality of predefined ports; and
 a memory map having plural memory locations, wherein each of the predefined ports has a physical address stored in one of the memory locations; and
 said method comprising:
 remapping the plurality of IO pins to one or more virtual ports, wherein any of the one or more virtual ports comprises selected IO pins from two or more predefined ports, and one IO pin in the virtual ports corresponds to one IO pin in the pin ports;
 wherein each of the one or more virtual ports has a virtual address stored in one of the memory locations, and wherein each of the one or more virtual ports allows access to the selected IO pins from two or more predefined ports simultaneously.

7. The method of claim 6, wherein the remapping is performed by a computer-executable program.

8. The method of claim 6, wherein the virtual ports consist of GPIO pins.

9. The method of claim 6, wherein the virtual ports have different numbers of IO pins.

10. The microcontroller of claim 6, wherein the virtual ports have a number of IO pins that is less than the bus width of the processor.

11. The method of claim 6, wherein the virtual ports have a number of IO pins that is equal to the bus width of the processor.

12. An electronic device, comprising:
 a GUI; and
 a processor communicatively coupled with the GUI, wherein the processor comprises:
 a plurality of in/out (IO) pins for transmitting and receiving data, wherein the pins are grouped into a plurality of predefined ports;
 a memory map having plural memory locations, wherein each of the predefined ports has a physical address stored in one of the memory locations; and
 at least one virtual port having a virtual address stored in one of the memory locations, wherein the at least one virtual port comprises selected IO pins from two or more predefined ports, and wherein the at least one virtual port allows access to the selected IO pins from two or more predefined ports simultaneously.

13. The electronic device of claim 12, wherein the at least one virtual port consists of general purpose IO (GPIO) pins.

14. The electronic device of claim 12, wherein the at least one virtual port has different number of IO pins.

15. The electronic device of claim 12, wherein the at least one virtual port has a number of IO pins that is less than the bus width of the processor.

16. The electronic device of claim 12, wherein the at least one virtual port has a number of IO pins that is equal to the bus width of the processor.

* * * * *